April 7, 1959  J. E. ROGERS  2,880,666
TYING MACHINE

Filed Dec. 23, 1957

INVENTOR.
JOHN E. ROGERS

BY

ATTORNEYS

INVENTOR.
JOHN E. ROGERS

April 7, 1959     J. E. ROGERS     2,880,666
TYING MACHINE Filed Dec. 23, 1957     10 Sheets-Sheet 5

INVENTOR.
JOHN E. ROGERS
BY
ATTORNEYS

United States Patent Office

2,880,666
Patented Apr. 7, 1959

2,880,666
TYING MACHINE
John E. Rogers, Salinas, Calif.

Application December 23, 1957, Serial No. 704,512

5 Claims. (Cl. 100—26)

This invention relates to and in general has for its object the provision of a bundle tying machine.

Frequently it is desired to tie produce such as celery, asparagus, and the like into bundles either because such bundles are easier to market and/or because an identifying mark can be incorporated in the tying tape or string.

More specifically, the object of this invention is the provision of a machine including means for forming an uncut length of tape into a loop for receiving a bundle of material; a first clamp for clamping the free end of said tape; means for resiliently retracting said tape thereby to snugly wrap said loop about said bundle under a predetermined tension; cutting means for severing said loop from said tape; second and third clamps disposed respectively on either side of said cutting means; means for closing said second and third clamps on said tape and for then operating said cutting means; and means for twisting said first and second clamps bodily about a common axis thereby to twist the free ends of said loop about themselves.

Another object of this invention is the provision of a tying machine of the character above described wherein said first and second clamps are mounted in a rotary clamp head journaled in the base or frame of the machine.

Still another object of this invention is the provision of a machine of the character above described wherein said first clamp is pivoted to said clamp head and biased to a predetermined position by a spring or the like.

A further object of this invention is the provision of a machine of the character above described wherein means is provided for moving the twisted ends of said loop toward said loop.

Another object of this invention is the provision of a machine of the character above described including a cylindrical bunch retainer provided with an internal, helical channel for receiving an uncut length of tape and forming it into a loop.

Still another object of this invention is the provision of a machine of the character above described wherein tape is supplied to it by a pair of disengageable, reversible friction rolls actuated by an air motor.

A further object of this invention is the provision of a machine of the character above described wherein means is associated with said air motor for insuring that a predetermined length of tape is always fed to the machine.

The invention possesses other advantageous features, some of which, with the foregoing, will be set forth at length in the following description where that form of the invention which has been selected for illustration in the drawings accompanying and forming a part of the present specification, is outlined in full. In said drawings, one form of the invention is shown, but it is to be understood that it is not limited to such form, since the invention as set forth in the claims may be embodied in other forms.

Referring to the drawings.

General assembly

Generally, and as shown in these various figures, my machine includes a frame or base subassembly A; a rotary clamp head subassembly B; a cylindrical bunch retainer and tape guide subassembly C; a tape cutter subassembly D; an end clamp subassembly E; a tape-feed subassembly F; a tape-feed drive subassembly G; a rotary clamp head drive subassembly H; a tape twist pusher subassembly I; and an automatic rotary valve subassembly J. All of these subassemblies, other than the frame subassembly A and the bunch retainer and tape guide subassembly C, are diagrammatically indicated in Fig. 15.

Frame or base subassembly A

Figure 1:
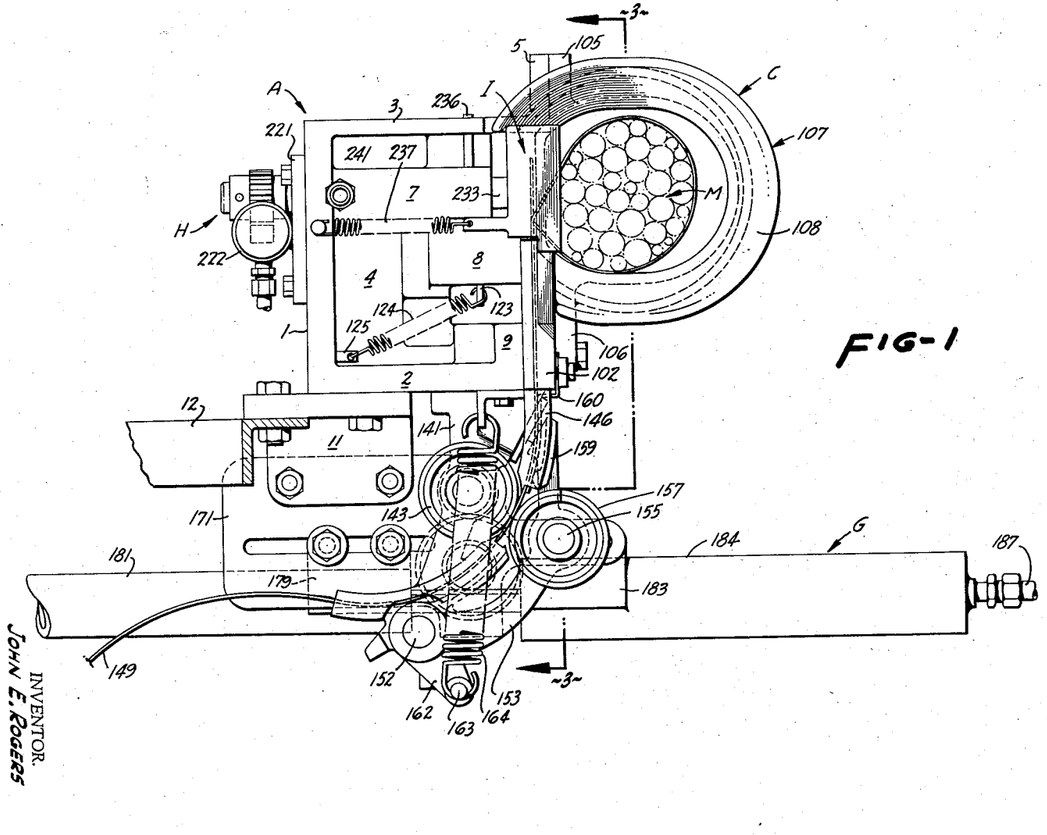
Fig. 1 is a front elevation of a bunch retaining and tying machine embodying the objects of my invention.
Figure 4:
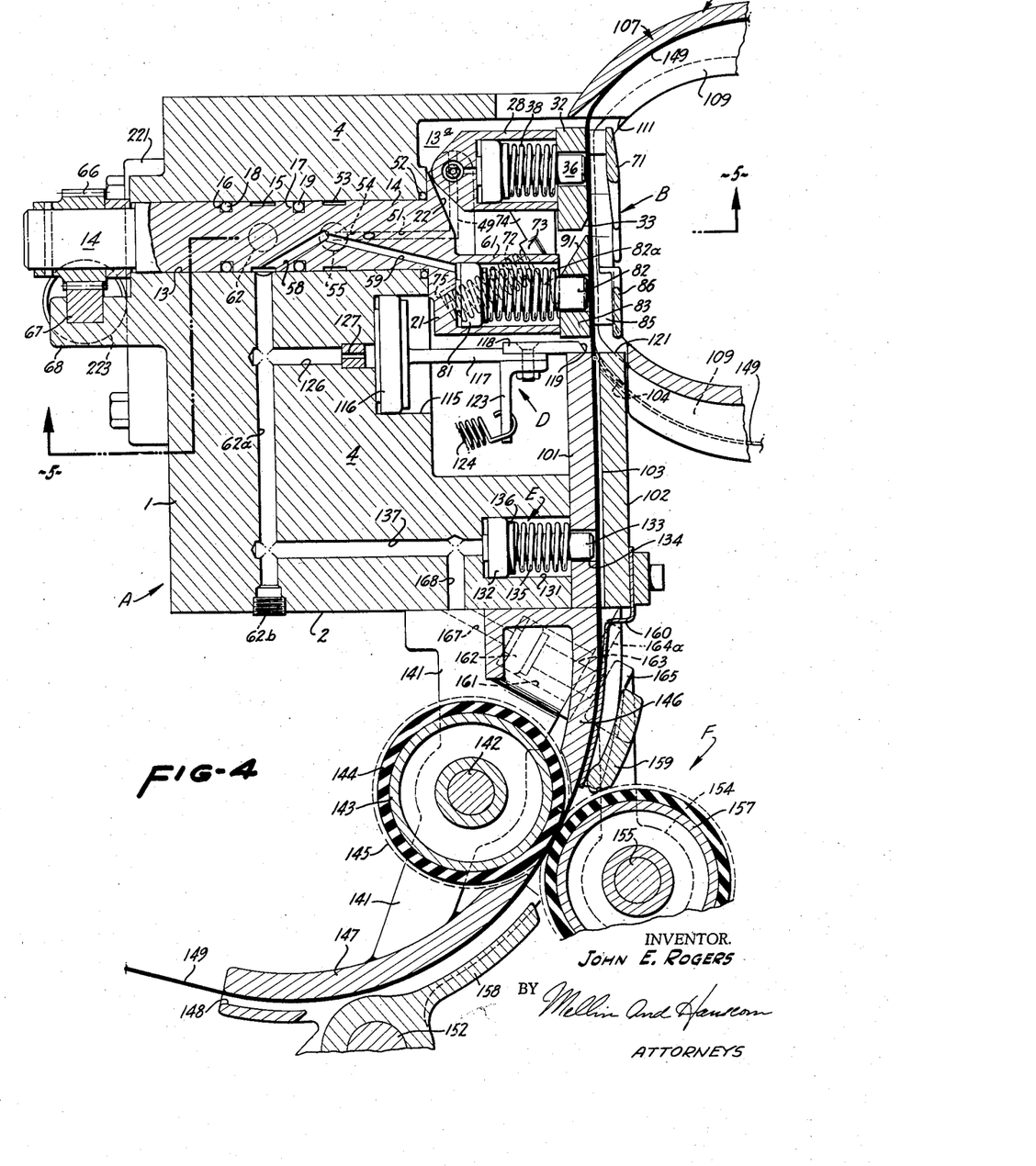
Fig. 4 is a vertical section taken on the section line 4—4 of Fig. 3.
Figures 5, 11:
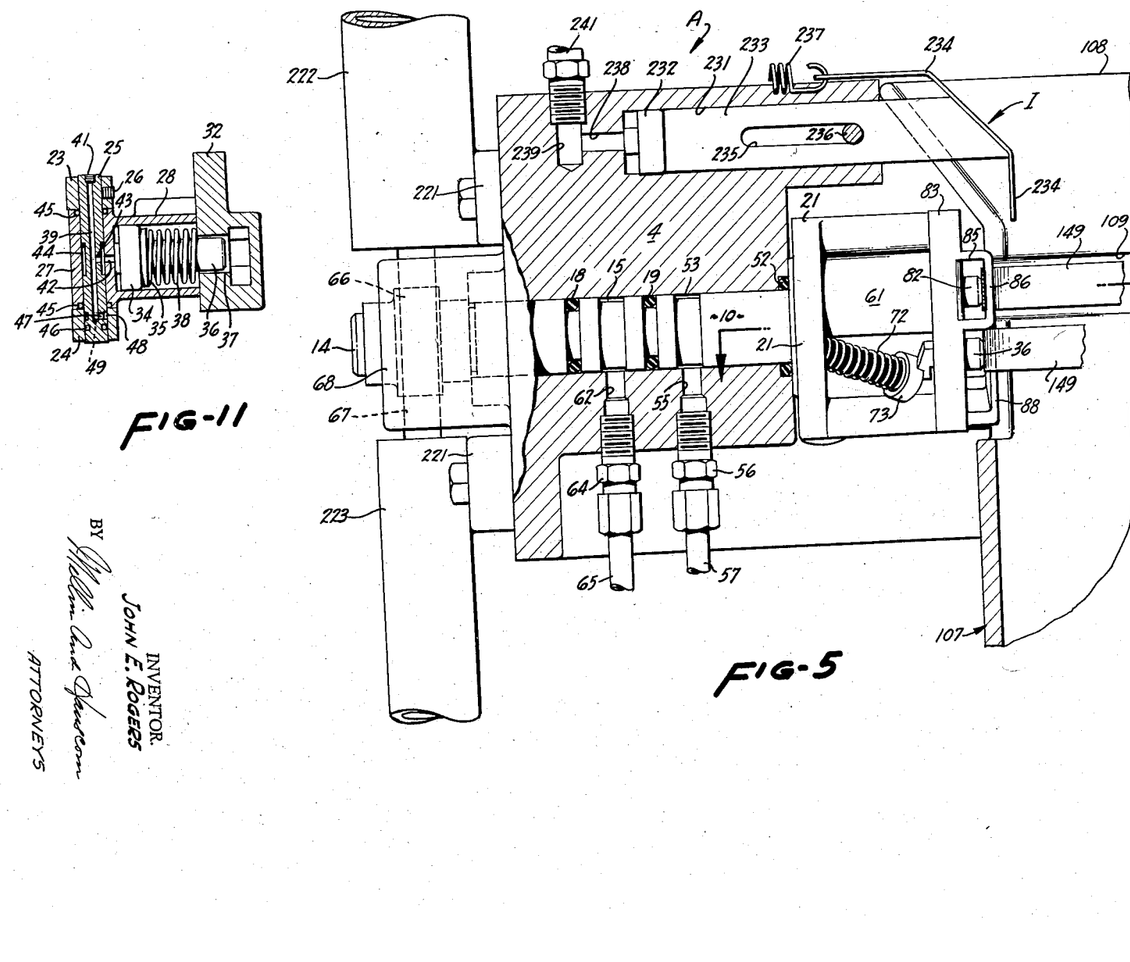
Fig. 5 is a fragmentary horizontal section taken on the section line 5—5 of Fig. 4.
Fig. 11 is a fragmentary section taken on the section line 11—11 of Fig. 3.

As best shown in Figs. 1, 4, and 5, the base or frame subassembly A includes an iron casting having a left hand side wall 1, a bottom wall 2, a top wall 3, and an intermediate upstanding web 4. Extending upwardly from the rear end of the top 3 (Fig. 1) is a flange 5, and similarly extending upwardly from the rear end of the bottom 2 is a flange 6, these flanges being used for the purpose of securing the bunch retainer and tape guide subassembly C to the frame A, as will presently be described in greater detail.

Cast integrally with the intermediate web 4, on the front side thereof and merging with the rear wall 1, is a cylindrical boss 7 which, as will presently be described in greater detail, constitutes a part of a pusher subassembly I.

Also formed integrally with the intermediate web 4 immediately below the forward or right hand end of the boss 7 (Fig. 1) is a generally semicylindrical boss 8 serving as support for one of the tape guide elements to be presently described. Cast integrally with the bottom wall 2 and extending upwardly therefrom is a flange 9, the outer face of which is coplanar with the outer end of the boss 8 and which likewise serves as a support for said one tape guide element.

Bolted to the bottom wall 2 is an angle bracket 11 serving, among other things, as a means for securing the entire machine to a frame, table, or pedestal 12 (Fig. 1).

Rotary clamp head assembly B

Formed adjacent the upper end of the intermediate web 4 is a bore 13 merging at its right hand or front end with a recess or chamber 13a (Fig. 4). Journaled in the bore 13 and extending therethrough is a shaft 14. Formed intermediate the ends of the shaft 14 is a peripheral fluid channel 15 and on either side thereof are sealing channels 16 and 17 for the snug reception of O rings 18 and 19.

Figure 9:
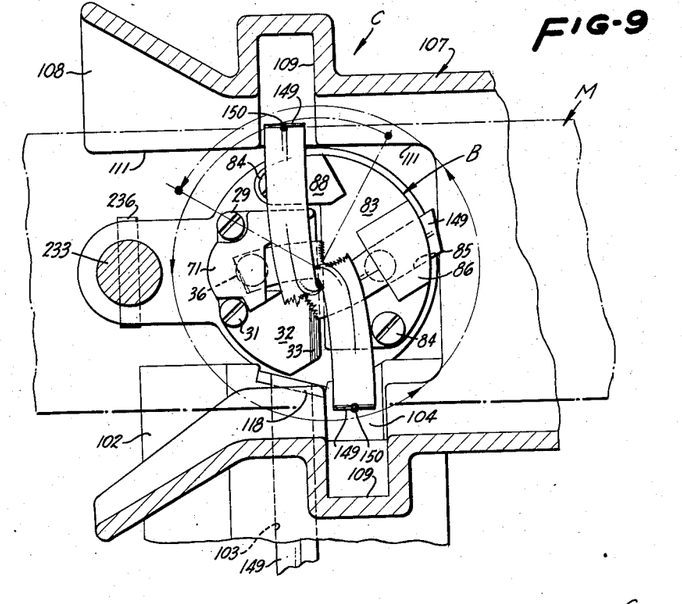
Fig. 9 is a view similar to that shown in Fig. 3, but wherein the twisting head of the device is shown as having rotated a part of a revolution.
Figure 10:
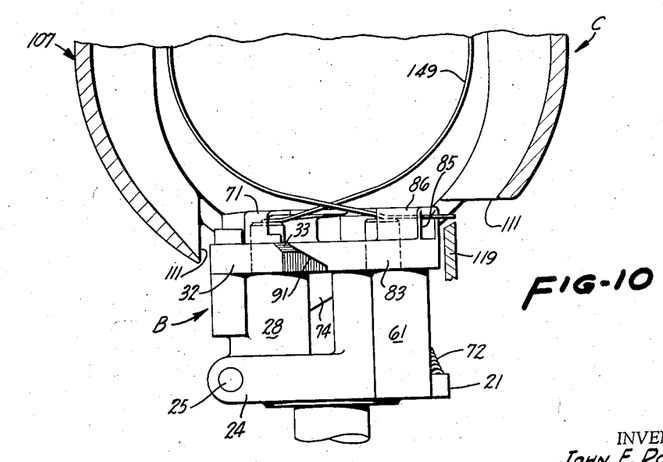
Fig. 10 is a fragmentary vertical section taken on the section line 10—10 of Fig. 5.

Merging with the right hand end of the shaft 14 is a clamp mount 21 provided on one side with a central recess 22 bounded by side walls 23 and 24 (Fig. 11). Extending through coaxial holes formed in the side walls 23 and 24 is a pin 25, this pin being fixed to the side wall 23 by a set screw 26. Journaled on the pin 25 is a sleeve 27, and formed integral therewith is a cylinder 28. Secured to the cylinder 28 over its outer end by screws 29 and 31 (Fig. 9) is a tape guide plate 32 provided with a slightly beveled forward edge 33. Slidably disposed within the cylinder 28 is a rubber piston 34 capped by a washer 35. Secured to the piston 34 is a pin or rod 36 extending through the piston at its lower end and extending at its upper end through a hole 37 formed in the guide plate 32. Surrounding the pin 36 within the confines of the cylinder 28 and operating between the washer 35 and the lower face of the tape guide plate 32 is a compression spring 38 serving to bias the piston 34 and its pins to their lowermost positions and wherein the free end of the pin 36 is substantially coplanar with the outer face of the tape guide plate 32. Formed in the pin 25 is an axial bore 39 closed at its open end by a plug 41 and communicating intermediate its ends with the cylinder 28 through holes 42 and 43 and a peripheral channel 44 formed in the pin 25. Sealing the ends of the sleeve 27 to the pin 25 and the walls 23 and 24 are O rings 45, and sealing the lower end of the pin 25 (as viewed in Fig. 11) to the wall 24 is an O ring 46. Communicating with the lower end of the bore 39 formed in the pin 25 through a radial hole 47 is a peripheral channel 48 formed in the pin 25. Provided in the wall 24 is a radial hole 49 arranged to communicate at one end with the peripheral channel 48 and communicating at its other end with a bore 51 formed in the shaft 14 (Fig. 4). As a result of this construction, it will be seen that there is an unobstructed passageway extending between the cylinder 28 at a point inwardly of its piston 34 and the bore 51 of the shaft 14.

Sealing the right hand end of the shaft 14 to the web 4 is an O ring 52, and formed in the shaft 14 between the O rings 19 and 52 is a peripheral channel 53. Formed in the shaft 14 is a bore 54 serving to connect the channel 53 with the bore 51. Provided in the web 4 (Fig. 5) is a bore 55 communicating with the peripheral channel 53, and threaded to the outer end thereof is a fitting 56 connected to an air line 57. It will therefore be seen that the cylinder 28 is at all times in communication with the air line 57 even when the shaft 14 is rotating.

Formed in the shaft 14 are intersecting bores 58 and 59, the bore 58 terminating in the channel 15 and the bore 59 terminating in a cylinder 61. Also communicating with the channel 15 is a bore 62 (Fig. 5). Threaded in the outer end of the bore 62 is a fitting 64 connected to an air line 65. As a result of this construction, the bores 59 and 62 are at all times in communication with the air line 65.

Secured to the outer free end of the shaft 14 is a pinion 66 meshing with a rack 67, the rack 67 being slidably disposed in a track 68 formed integrally with and extending rearwardly from the rear wall 1 of the base or frame member A.

Formed integrally with the tape guide plate 32 is a channel shaped stationary clamp jaw 71 in axial alignment with the pin 36. Here it should be noted that the web of the clamp jaw 71 is spaced from the outer face of the plate 32 a sufficient distance to readily receive with ample clearance the tape for which the machine is designed. Furthermore, it should be noted that the jaw 71, together with the outer face of the guide plate 32, defines a generally rectangular recess for the reception of the free end of a length of tape and that the rear wall of this recess serves as a stop for preventing the tape from passing beyond the guide plate. If when the free end of a section of tape has been located between the fixed jaw 71 and the pin 36, the piston is moved outwardly under the influence of air pressure behind the piston, the free end of the tape will be locked between the end of the piston and the fixed clamp jaw 71. For ready reference, then, the structure can be referred to as a clamp including a fixed jaw and a movable jaw.

As best shown in Figs. 4 and 5, the cylinder 28 is biased towards its horizontal position by a compression spring 72. One end of this spring is seated in a retaining cup 73 formed integrally with a finger 74 extending outwardly from the outer end of the cylinder 28. The other end of the spring 72 is receivable in a hole 75 formed in the clamp mount 21. As a result of this construction, it will be seen that the tape clamp above described and which will sometimes hereinafter be referred to as a "first clamp" can rotate about the axis of the pin 25 only in response to a force sufficient to overcome the biasing action of the spring 72.

Slidably disposed within the cylinder 61 is a rubber piston 81, and secured to and extending therethrough is a piston rod or pin 82. The length of the pin 82 is such that in the retracted position of the piston 81 (Fig. 4) the free end of the pin 82 is substantially flush with the outer face of a tape guide plate 83 secured over the top of the cylinder 61 by screws 84. Surrounding the pin 82 is a compression spring 82a serving to bias the pin 82 to its normally retracted position as shown in Fig. 4. Extending outwardly from the guide plate 83 is a tape guide channel 85 including a web 86 serving as a fixed jaw of a second clamp. As best shown in Fig. 5, the web 86 is in alignment with the pin 82, and consequently the pin 82 can close on the web 86 to clamp a section of tape disposed between these two members. Here it should be noted that although this second clamp of necessity rotates bodily on the axis of the shaft 14, it has no pivotal movement on the clamp mount 21.

Formed integrally with the guide plate 83 adjacent the guide channel 85 is a tape guide member 87 having an overhanging web 88 and which, with the wall 89 of the channel 85, serves as a guide channel for a section of the tying tape. From an inspection of Fig. 3 it will be noted that this channel is in alignment with the fixed jaw of the first clamp when these members are in their normal positions so that tape moving beneath the overhanging web 88 will be guided into the first clamp. Here it should be noted that the guide plate 83 is provided with an undercut edge 91 adjacent the beveled portion 33 of the plate 32 so that these members will clear each other when the first clamp is rotated about the pin 25.

Bunch retaining and tape guide subassembly C

Mounted over the lower half of the right hand side of the base or frame member subassembly A is a generally rectangular, vertically disposed plate 101 (Fig. 4). Mounted over the plate 101 is a second rectangular plate 102 formed on its inner face with a vertical tape guide channel 103 aligned with the second clamp above described. Formed on the upper edge of the plate 102 is an inclined notch or tape guideway 104 (Figs. 3 and 9) in alignment with the said first clamp.

Figure 3:
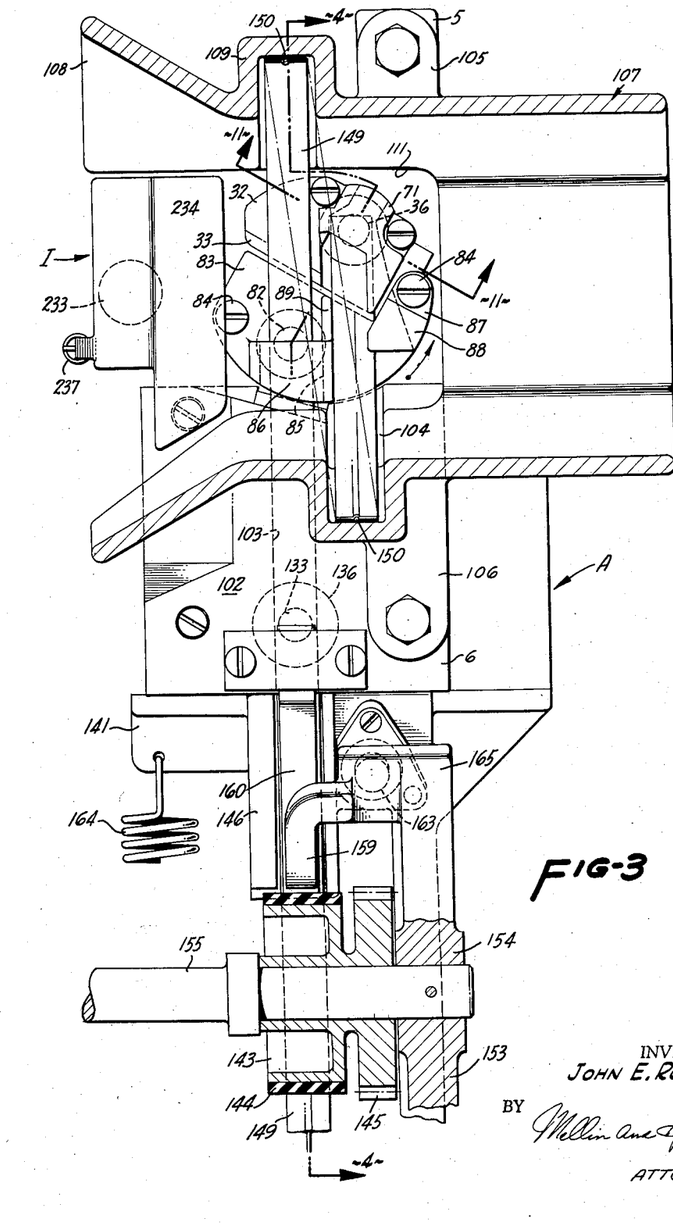
Fig. 3 is a fragmentary vertical section taken on the section line 3—3 of Fig. 1.

Bolted or otherwise secured to the flanges 5 and 6 of the subassembly A and to the rectangular plates 101 and 102 are the lugs 105 and 106 of a generally cylindrical bunch retainer and loop guide 107. Provided on the forward end of the guide 107 is a forwardly flared bell or mouth 108 serving to guide articles to be tied into the loop guide and retainer 107. Formed substantially at the junction of the retainer 107 and its mouth 108 is a helical tape guide channel 109, these three members being cut away as at 111 for the reception of the forward end of the rotary clamp subassembly B. Here it should be noted that the left hand lower end of the helical channel 109, as viewed in Fig. 3, is in alignment with the said second clamp and that the tape is delivered to this end of the helical channel 109 through the upwardly extending channel 103 formed in the plate 102. Both ends of the channel 109 are disposed within the confines of the cut-away portion of the retainer 107, the terminal or right hand end of the channel 109 (as viewed in Fig. 3) being in alignment with said first and pivoted clamp. The channel 109 encompasses 360 degrees, less the number of degrees subtended by the cut-away 111, and the ends of the channel are laterally offset only by the width of the channel. Actually, the first pivoted clamp constitutes the terminus of the helical channel 109, and the second fixed clamp serves as the beginning of this channel.

*Tape cutter subassembly D*

As shown in Fig. 4, the web 4 of the base subassembly A is formed with a cylinder 115. Slidably disposed in the cylinder 115 is a rubber piston 116, and secured thereto is an axially extending strap 117. Attached to the free end of the strap 117 is a knife 118 having an inclined and beveled cutting edge 119 slidable in a horizontal guide notch 121 formed in the plate 101 aligned with the vertical channel 103 of the plate 102 and aligned with the second clamp.

Also attached to the outer end of the strap 117 is a lug 123, and secured to the free end thereof is one of a tension spring 124 (Fig. 4). The other end of the spring 124, as best shown in Fig. 1 is secured to the lower end of the wall 1 through a finger or lug 125. As a result of this construction, the cutting edge 119 of the knife 118 is biased inwardly to a point wherein it normally clears the channel 103 (Fig. 4).

Formed in the web 4 is a lateral bore 126 communicating at one end with the vertical bore 62a and communicating at its other end with the closed end of the cylinder 115 through a restricted flow control orifice 127. As a result of this, and bearing in mind that the bores 59 and 126 are simultaneously subjected to air under pressure, the second and fixed clamp will nevertheless close prior to the activation of the knife 118 in view of the retarding effect of the restricted orifice 127. Here it should be noted that the lower end of the orifice 62a is sealed with a plug 62b.

*End clamp subassembly E*

Before the knife 118 is brought into operation to sever the tying tape at a point inwardly of a formed loop it is essential to clamp the tape at a point inwardly of the knife so as to hold the severed end of the tape in alignment with said second clamp and the entrance to the helical guide channel 109 in readiness for a succeeding cycle of operation. To this end, a cylinder 131 is provided in the lower front end of the base web 4. Slidably disposed in the cylinder 131 is a rubber piston 132, and secured thereto is a pin 133 serving as the movable jaw of a third clamp. As shown in Fig. 4, the outer free end of the pin 133 extends through a hole 134 formed in the plate 101. Surrounding the pin 133 is a compression spring 135 operating between a washer 136 seated on the piston 132 and the inner face of the plate 101. The spring 135 serves to bias the pin 133 inwardly to prevent its outer end from protruding outwardly beyond the outer face of the plate 101. As will be seen from Fig. 4, the closed end of the cylinder 131 communicates with the bore 62a through a lateral bore 137, and consequently the pin 133 will advance into its clamping position simultaneously with the closing of the pin or jaw 82 of the second clamp. Immediately following the closing of the second and third clamps, the knife 118 advances across the end of the channel 103.

*Tape feed subassembly F*

Secured to and depending from the lower wall 2 of the base subassembly A is a bracket 141 (Figs. 3 and 4), and journaled therein intermediate its ends is a shaft 142. Keyed to one end of the shaft 142 is a friction roller 143 provided with a flat rubber tire 144, the roller 143 and its tire 144 being in alignment with the channel 103 of the plate 102. Secured to the shaft 142 intermediate the bracket 141 and the roller 143 is a pinion 145.

Figure 2:
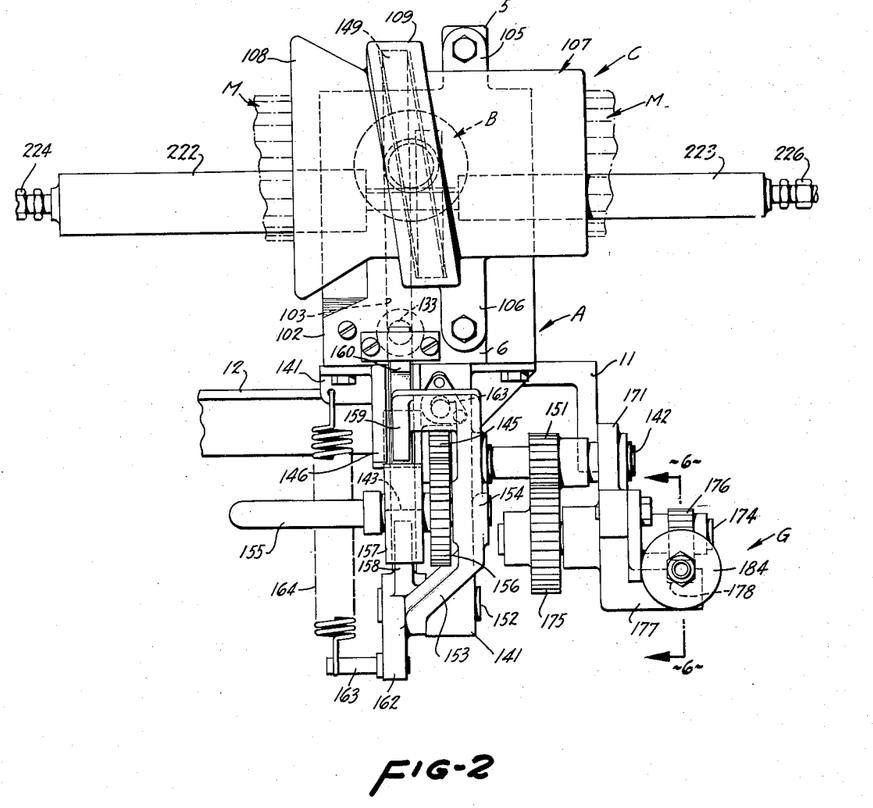
Fig. 2 is a right hand side elevation of the machine illustrated in Fig. 1.

Formed integrally with the bracket 141 adjacent the lower end of the plate 101 and overlying the upper end of the roller 143 is a slightly arcuate tape track 146 in line with and forming a continuation of the channel 103. Extending forwardly from the bracket 141 below the roller 143 is a lower arcuate track 147 in alignment with the upper track 146. As best illustrated in Fig. 4, the lower end of the track 147 is provided with a slot 148 through which the free end of a section of tying tape 149 can be threaded and which serves to prevent the tape from falling from the track at this point. As best illustrated in Fig. 2, the shaft 142 is provided at its free end with a pinion 151 which, as will be later described, serves as part of the drive for the shaft 142.

Fixed to the lower free end of the bracket 141 is a stub shaft 152, and journaled thereon is an arm 153. Formed intermediate the ends of the arm 153 is a boss 154, and mounted therein is a transverse shaft 155. Journaled on the shaft 155 in alignment with the pinion 145 and arranged to be placed in mesh therewith is a gear 156. Also journaled on the shaft 155 and fixed to the gear 156 is a roller 157 provided with a soft rubber tire. As best shown in Fig. 4, the roller 157 is arranged to close on the roller 143 at a point intermediate the contiguous ends of the tracks 146 and 147. As a result of this construction, the tape 149 is engaged by the soft rubber tires of the two rollers at this point and can be advanced or retracted depending upon the direction of rotation of the two rollers, which of course always rotate in opposite directions relative to each other due to the action of the gears 145 and 156.

Fixed to the bracket 141 adjacent the shaft 152 is a finger 158 arranged to overlie the upper end of the lower tape track 147 (Fig. 4) and to thus aid in retaining the tape 149 in its proper position within this track. For a similar reason the free end of the arm 153 is provided with an overturned finger 159 arranged to overlie the upper track 146. Secured to the plate 102 is a slightly arched spring finger 160 extending downwardly within the confines of the upper track 146, the lower end of this finger being biased into said track by the free end of the finger 159.

Formed integrally with the arm 153 is a finger 162 (Fig. 2) provided with a transversely extending pin 163. Secured to the pin 163 is one end of a tension spring 164, the upper end of this spring being anchored to the upper end of the bracket 141 (Figs. 1 and 2). Preferably, the angular relationship between the finger 162 and the shaft 152 is such that when the two rollers 143 and 157 are in their closed operative positions, as shown in Fig. 1, the center line of the axis of the shaft 152 so that tially to the right of the axis of the shaft 152 so that the spring 164 can be used not only to bias the two rollers toward their operative tape-driving positions but also to positively hold the two rollers in their completely inoperative positions. In this latter position, the spring 164 would be disposed to the left of the shaft 152 in any view of the device similar to that shown in Fig. 1. The primary purpose of placing the spring 164 beyond dead center of the shaft 152 and to the left thereof (as viewed in Fig. 1) is to enable the tape to be more readily threaded into the machine.

It should here be noted that it is necessary to feed a predetermined length of tape into the machine during the start of each cycle of operation, and this course is effected by rotating the friction feed rollers 143 and 157 a predetermined number of times. As will be presently described, the rollers 143 and 157 are driven in response to the linear movement of a rack 178. This means that to feed a predetermined length of tape into the machine at the start of each cycle of operation, this rack must always be returned to its home or starting position before the rollers 143 and 157 are driven. However, after the tape is fed into the machine and its leading end is clamped by the said first clamp, a bunch of produce or the like is introduced into the loop of tape previously formed; the tape is retracted so as to draw the tape loop snugly around the bunch. Since the bunches successively fed into the machine vary in size, the extent to which the tape is retracted also varies. This means that the terminal position of the rack which drives the friction feed rollers 143 and 157 after the tape has been retracted varies with the size of the bunch being tied. For this reason it becomes necessary to release the pivoted friction feed roller 157 so as to permit the roller 143 and the rack referred to, to be returned home without at the same time disturbing the tape.

Figure 15:
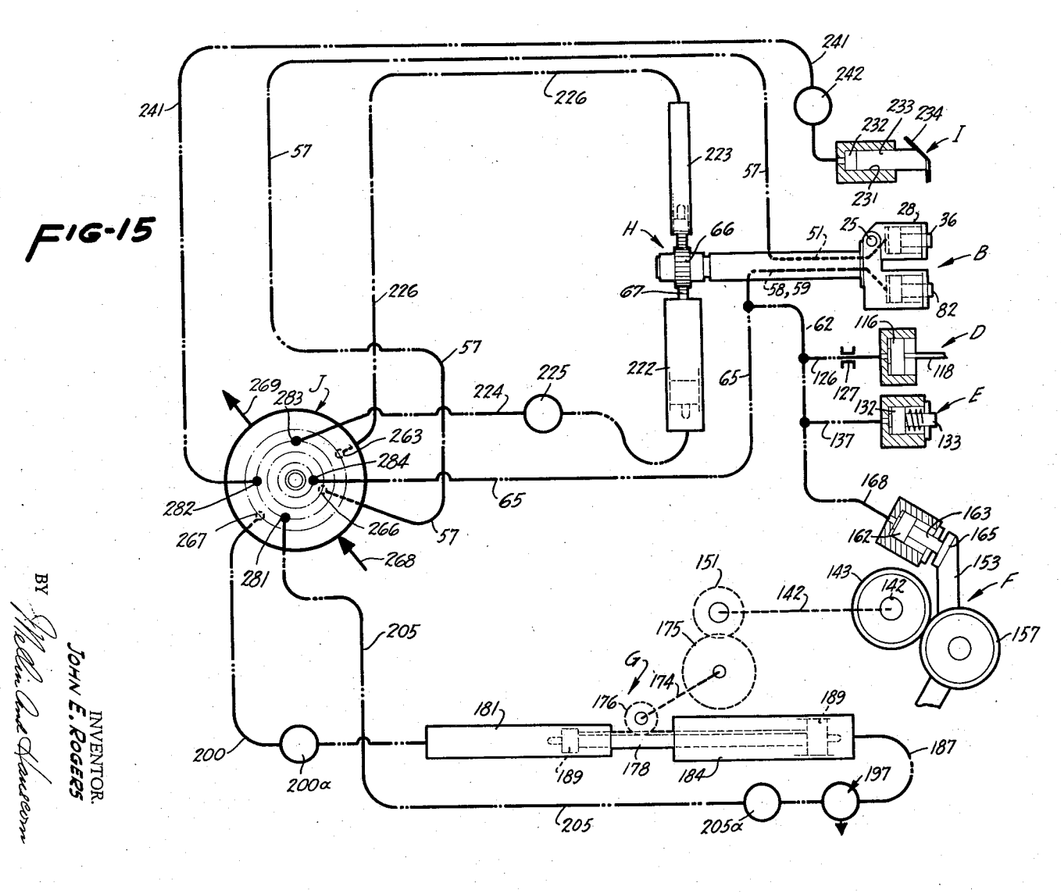
Fig. 15 is a diagrammatic view of the air control system of my machine.

To this end, the bracket 141 is formed with an inclined cylinder 161, as best shown in Figs. 3, 4, and 15. Slidably disposed in the cylinder 161 is a piston 162, and connected thereto is a push rod or pin 163 extending through a coverplate 164a. Formed on the finger 159 in axial alignment with the pin 163 is a land 165 (Fig. 4). As best indicated in Fig. 4, the closed end of cylinder 161 communicates through a bore 167 formed in the bracket 141 and a bore 168 formed in the web 4, with the bore 137. As a result of this construction, it will be seen that when the bore 137 is subjected to air pressure, the pin 163 will be forced outwardly against the biasing action of the spring 166 so as to rotate the arm 153 about the axis of the shaft 152 a sufficient extent to move the roller 157 out of engagement with the tape 149. This action will occur after the said second and third clamps have closed and just prior to the time at which the knife 118 is activated. With the tape so disengaged by the rolls, the roll-driving mechanism can then be returned to its home position preparatory to the initiation of the next succeeding cycle of operation.

*Tape feed drive subassembly G*

Figures 6, 7, 8:
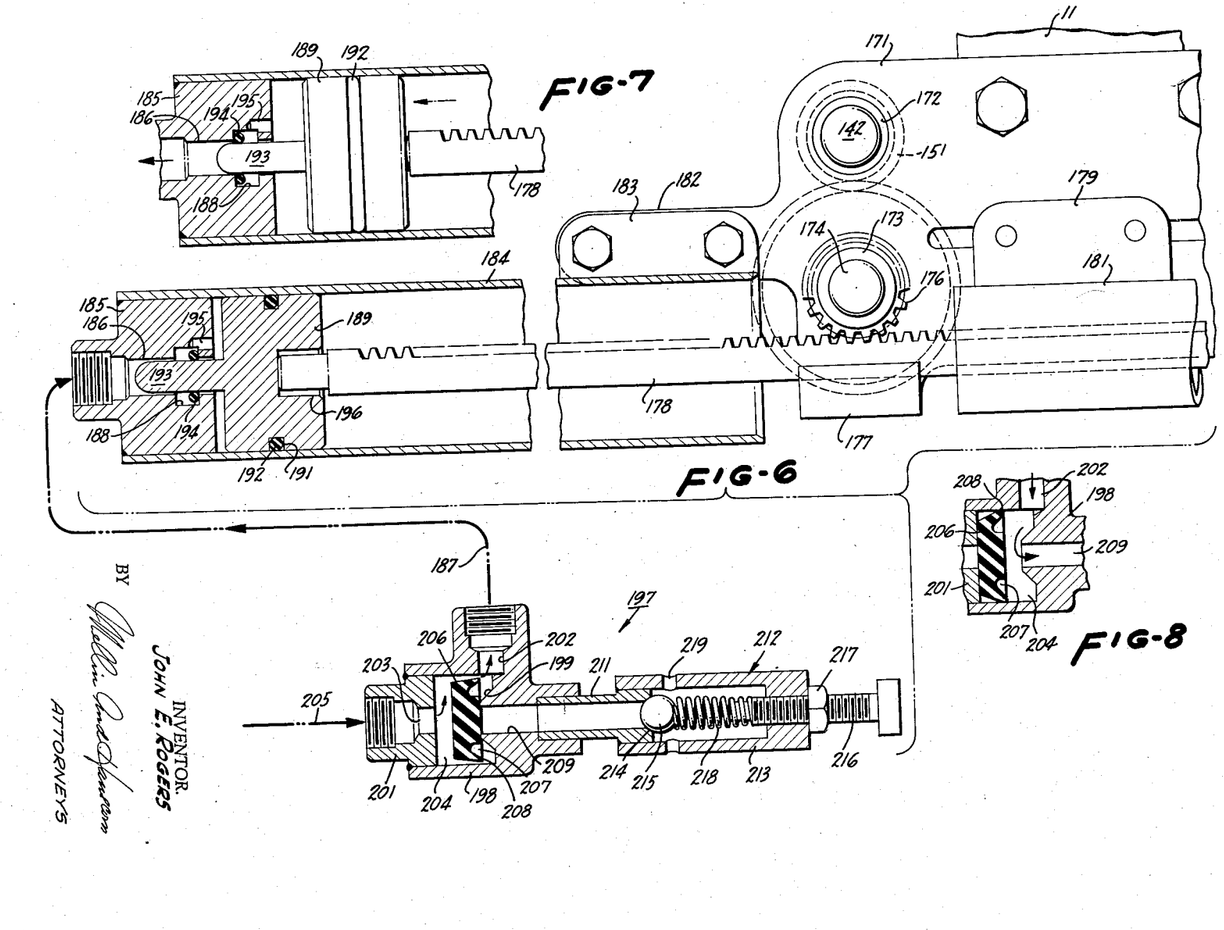
Fig. 6 is a fragmentary vertical section taken on the section line 6—6 of Fig. 2.
Fig. 7 is a fragmentary detail of the left end of the rack operated valve illustrated in Fig. 6, but shown at the end of its return stroke.
Fig. 8 is a fragmentary section of the piston valve illustrated in the lower left hand part of Fig. 6, but showing the piston valve in its closed position.

Bolted to the bracket 11 on the rear side of the machine is a vertically disposed plate 171 (see Fig. 1 wherein the plate 171 is shown in front elevation in the background, Fig. 2 showing the plate 171 in right hand side elevation, and Fig. 6 showing the plate 171 and its associated parts in detail). Mounted in the plate is a bearing 172 to accommodate and support the free end of the shaft 142 (Figs. 2 and 6). Provided in the plate 171 immediately beneath the shaft 142 is a bearing 173, and journaled therein is a stub shaft 174. Keyed or otherwise secured to the forward end of the shaft 174 is a gear 175 in mesh with the pinion 151. Keyed or otherwise secured to the rear end of the shaft 174 is a pinion 176. Formed along the lower edge of the plate 171 is an upwardly facing channel or track 177, and slidably accommodated therein is a rack 178 in mesh with the pinion 176.

Bolted to the body of the plate 171 for adjustment therealong is a bracket 179, and welded thereto is a tape return air cylinder 181 for receiving one end of the rack 178. Similarly bolted to an end extension 182 of the plate 171 is a bracket 183, and welded thereto coaxially with the air cylinder 181 is a tape-feed air cylinder 184 for the reception of the other end of rack 178. As clearly shown in Fig. 6, the inner contiguous ends of the cylinders 181 and 184 are open, although the outer end of each of the cylinders 181 and 184 is sealed by a plug 185, as shown in Fig. 6, with reference to the cylinder 184. Formed in each plug 185 is a stepped bore 186 communicating at its outer end with an air line 187. Formed intermediate the ends of the bore 186 and coaxially therewith is a channel 188. Slidably disposed within each of the cylinders 181 and 184 is a piston 189 provided with a peripheral channel 191 for the reception of an O seal ring 192. Extending outwardly from each piston 189 coaxially therewith is a valve stem 193 provided with a rounded end and receivable within the adjacent bore 186 with positive clearance. Accommodated within the channel 188 is an O ring 194 receivable on the valve stem 193 and operable therewith to close either side of the channel 188. It should here be noted that the diameters of the O ring 194 and the channel 188 should be so correlated that when the O ring 194 is disengaged from the valve stem 193 the O ring is still sufficiently in line with the valve stem to permit the rounded end of the valve stem to find and pick up the O ring. Extending into the plug 185 from its inner side is passageway 195 communicating with the channel 188. Formed in the inner end of the piston 189 is an axial recess 196 for the reception of the adjacent end of the rack 178. As shown in Fig. 6, the rack 178 moves to the right in response to the movement of the piston 189 in that direction, and the piston 189 moves to the right only under the influence of air pressure on its outer side, such pressure being obtained by the passage of air from the line 187 into the bore 186 and initially through the channel 188 and the passageway 195 into the chamber between the plug 185 and the piston 189. When the piston 189 has moved to the right a sufficient extent so that its stem 193 clears the O ring 194, air under pressure can then pass into said chamber without restriction through the inner end of the bore 186. The piston 189 can move to the left only in response to the movement of the rack 178 in that direction under the influence of a piston 189 associated with the return cylinder 181, this cylinder, except for size, being constructed in the same manner as the tape-feed cylinder 184. Upon the return movement of the rack 178 (Fig. 7), the rounded end of the valve stem 193 passes through the open end of the bore 186 and the channel 188, and in so doing it finds and picks up the O ring 194 and carries it into partial sealing engagement with the left hand wall of the channel 188. At this point, the further restricted movement of the piston 189 to the left merely serves to cushion the terminal stroke of the piston 189. When this occurs, the rack 178 is in its starting position ready to feed another predetermined length of tape.

As illustrated in the lower part of Fig. 6, the air line 187 communicates with a valve generally designated by the reference numeral 197. Included in the valve 197 is a cylinder 198 provided with a valve seat 199 at one end and closed at its other end with a plug 201. Formed in the cylinder 198 adjacent the valve seat 199 is a radial passageway 202 communicating with the line 187. Formed in the plug 201 is an axial passageway 203 communicating with the cylinder chamber 204 and arranged at its open end to communicate through an air line 205, including a conventional flow control valve 205a (Fig. 15), with the automatic rotary cycle control valve subassembly J. Disposed within the chamber 204 is a resilient valve closure member 206, frustoconical in cross-section, and provided with a circular channel 207 at its inner end to thereby form an annular feathered edge 208. In this position of the closure member (Fig. 6), air from the line 205 is free to pass by the closure member into the line 187 for the purpose of moving the rack 178 to the right. Also, in this position of the closure member 206, it closes off an axial bore 209 formed in the cylinder 198 and communicating through a nipple 211 with a pressure relief valve 212. The valve 212 includes a cylinder 213 closed by one end of the nipple 211, this end of the nipple being formed with a hemispherical valve seat 214 for the reception of a ball check 215. Threaded through the free end of the cylinder 213 is an adjusting screw 216, a lock nut 217 being threaded on the screw 216 external to the cylinder 213. Mounted on the inner end of the screw 216 is a compression spring 218 operating against the ball check 215 and serving to bias the ball check into sealing engagement with the valve seat 214. Formed in the cylinder 213 are exhaust passageways 219. As a result of this construction, it will be seen that if the pressure within the line 187 is greater than the pressure within the line 205, the valve closure member will expand and move to the left as shown in Fig. 8 to thereby close the passageway 203 and to open the bore 209. The air in the cylinder 184 will now be exhausted to atmosphere through the pressure relief valve 212 and thus maintain a preadjusted back pressure serving to control the tape tension around the bunch. Here it should be noted that, as shown in Fig. 15, the right hand end of the tape return cylinder 181 communicates through a line 200, including a flow control valve 200a, with control valve subassembly J.

Rotary clamp head drive subassembly H

Bolted to the left side of the base or frame 1 is a bifurcated vertical plate 221, and welded thereto is a tape clamp head twisting cylinder 222 and a coaxial untwisting or return cylinder 223, the automatic cycle control subassembly J being in communication with the cylinder 222 through a line 224, including a conventional flow control valve 225, and with the cylinder 223 through a line 226 (Fig. 15). The construction of the cylinders 222 and 223 and their associated piston is identical to the construction of the cylinders 181 and 184 for advancing and retracting the tape, and in each instance the structure may be considered as an air motor. Associated with the cylinders 222 and 223 is a rack 67 (Fig. 4), which as previously described is in mesh with the pinion 66 keyed to the shaft 14.

Tape twist pusher subassembly I

After the tape loop ends have been twisted, it is preferable that these ends be moved upwardly out of the way of the rotary clamp head before the clamp head is rotated back to its home position so as to avoid any possibility of untwisting the ends of the loop.

To this end, the base 1 is provided with a horizontal cylinder 231 (Figs. 1, 5, and 15) for the sliding reception of a piston 232. Secured to the piston 232 is an outwardly extending bar 233, and mounted on the free end thereof adjacent the rotary clamp head subassembly B is a pusher plate 234. Formed in the bar 233 intermediate its ends is a slot 235, and receivable therein is a retaining pin 236 removably mounted in the base 1. Fastened to the plate 234 is one end of an inwardly biasing tension spring 237, the opposite end thereof being anchored to the wall 1 of the base subassembly A. Formed in the base subassembly is a passageway 238 communicating at one end with the cylinder 231 and at its other end with a bore 239 communicating with an air line 241, including a conventional flow control valve 242. As illustrated in Fig. 15, the other end of the line 241 communicates with the rotary control valve subassembly J.

Automatic rotary control valve subassembly J

Figure 13:
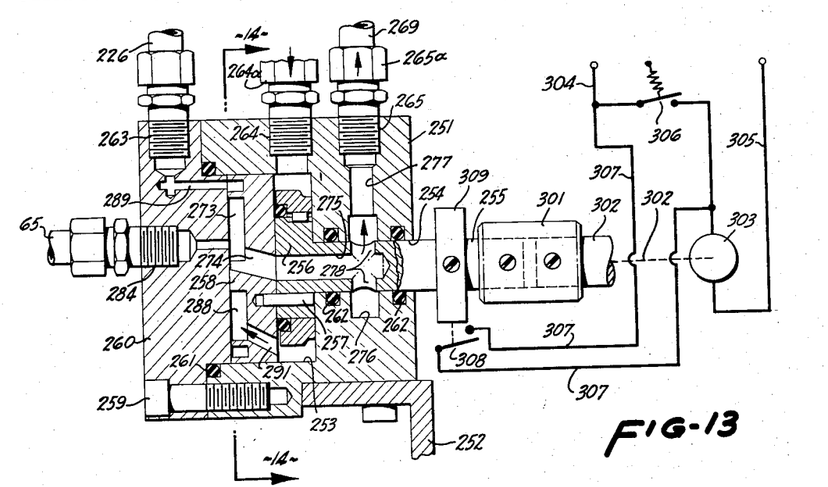
Fig. 13 is a fragmentary longitudinal section taken on the section line 13—13 of Fig. 12.

Included in the control valve subassembly J is a stationary valve body 251 carried by the base subassembly A by a bracket 252 (Fig. 13). Formed in the valve body 251 is a cylindrical recess 253 and a coaxial bore 254. Journaled in the bore 254 is a shaft 255 provided at its inner end with a hub 256 disposed within the confines of the inner end of the recess 253. Journaled in the recess 253 and keyed to the hub 256 by a pin 257 is a rotary valve disc 258, and fastened to the valve body 251 over the valve disc 258 by screws 259 is a cap 260. Disposed between the cap 260 and the valve body 251 is an O seal ring 261, and surrounding the shaft 255 within channels formed in the valve body 251 are axially spaced O seal rings 262.

Formed in the valve body 251 and the cap 260 are five radially extending threaded bores 263, 264, 265, 266, and 267. Threaded respectively in these bores are fittings 263a, 264a, 265a, 266a, and 267a. Connected to the fitting 264a is a line 268 (Fig. 15) arranged to be maintained under any desired operating air pressure, such as for example, 85 p.s.i. The fitting 265a is merely vented to atmosphere through a line 269. Here it should be noted that the function of the valve assembly J is to connect the various lines 57, 205, 200, 65, 224, 226, and 241 alternatively with the pressure line 268 and the exhaust line 269 in the sequence illustrated by the graph of Fig. 16 once during each cycle of operation of the machine.

Figures 12, 14:
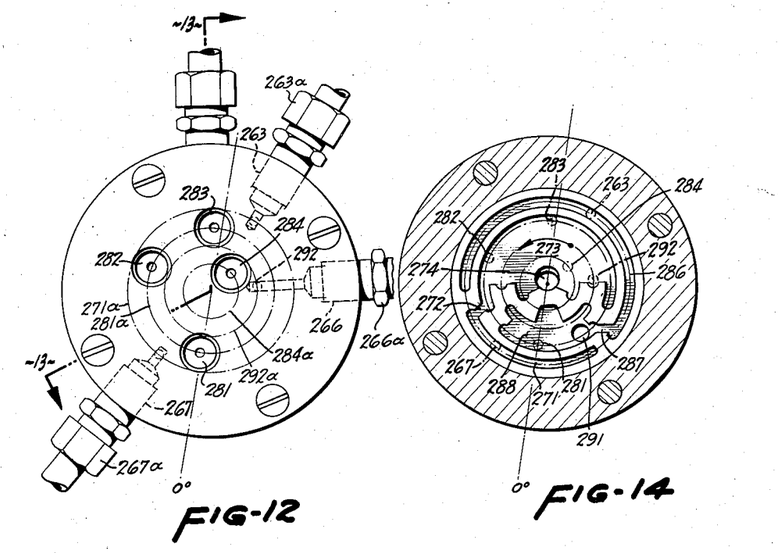
Fig. 12 is an end view of the rotary disc valve associated with my machine for controlling its cycle of operation.
Fig. 14 is a fragmentary section taken on the section line 14—14 of Fig. 13.

To this end, the valve disc 258 is provided on its left hand face, as viewed in Fig. 13, with a first circular recess 271 communicating through a passageway 272 with a sector shaped recess or chamber 273 subtending an angle of somewhat more than 180° (Fig. 14). The chamber 273 communicates through a slightly inclined central passageway 274 (Fig. 13) formed in the valve disc 258 with an axial bore 275 formed in the shaft 255. Provided in the valve body 251 is an annular channel 276 communicating with the bore 265 through a radial passageway 277 merging with the bore 265, and formed in the shaft are radial passageways 278 serving to establish communication between the bore 275 and the passageway 277. Since the line 269 is open to atmosphere, it will be seen that the above structure serves to always maintain the recess or chamber 273 and the circular recess 271 under atmospheric pressure.

Formed in the stationary valve cap 260 are four threaded bores 281, 282, 283, and 284. The bore 281 is arranged to connect through a conventional fitting with the line 205, and similarly the bore 282 communicates with the line 241, the bore 283 with the line 224, and the bore 284 with the line 65.

Provided in the valve disc 258 is a circular channel 286 formed on the same radius as the channel 271, the circle on which these two channels lie being indicated on Fig. 12 as 271a. Communicating with the channel 286 through a cross channel 287 (Fig. 14) is a sector shaped chamber 288. The axes of the bores 281, 282, and 283 intersect the common circle 281a, and the axis of the bore 284 intersects the common circle 284a. Communication between the inner end of the bore 263 and the channel 286 is established by a longitudinally extending bore 289 formed in the valve cap 260 and intersecting the outer circle 271a. As a result, the channels 271 and 286 are successively brought into communication with the line 226 once during each revolution of the valve disc 258.

Since the lower end of the bore 284 intersects the circle 284a, the line 65 will be placed alternatively in communication with the chambers 273 and 288 once during each cycle of revolution of the valve and consequently connected alternately with pressurized chamber 288 and exhaust chamber 273 during each cycle of operation.

Extending longitudinally through the valve disc 258 is an inclined passageway 291 (Fig. 13) for establishing communication between the closed end of the main valve bore 263 (which as above stated is maintained under any desired air pressure) and the chamber 288. The fitting 263a, as illustrated in Figs. 13 and 15, connects with the line 226 leading to the return cylinder 223.

As indicated in Figs. 12 and 13, the inner end of the bore 266 communicates through a longitudinal passageway 292 alternately with the chambers 273 and 288, for the inner end of the passageway 292 lies on the circle 292a which passes through both of these chambers. The fitting 266a of the bore 266 is connected with the line 57 for actuating the piston or jaw 36 of the pivoted first tape clamp.

The inner end of the bore 267, as indicated in Figs. 12 and 14, terminates in the outer circle 271a and consequently alternately communicates with the channels 271 and 286 to thereby alternately subject the tape return line 200 to air pressure and exhaust.

Broadly viewed, the valve disc 258 serves to successively and alternately connect each of the seven air lines 57, 65, 200, 205, 224, 226, and 241 with the air pressure line 268 and with the exhaust line 269. The contour of the channels and chambers of the valve disc 258 determines the angle through which each of the operating lines is sujected to air pressure and exhaust, and the location within the valve cap 260 of the terminal ends of the operating lines, determines the sequence in which each line is subjected to air pressure and exhaust.

Figure 16:
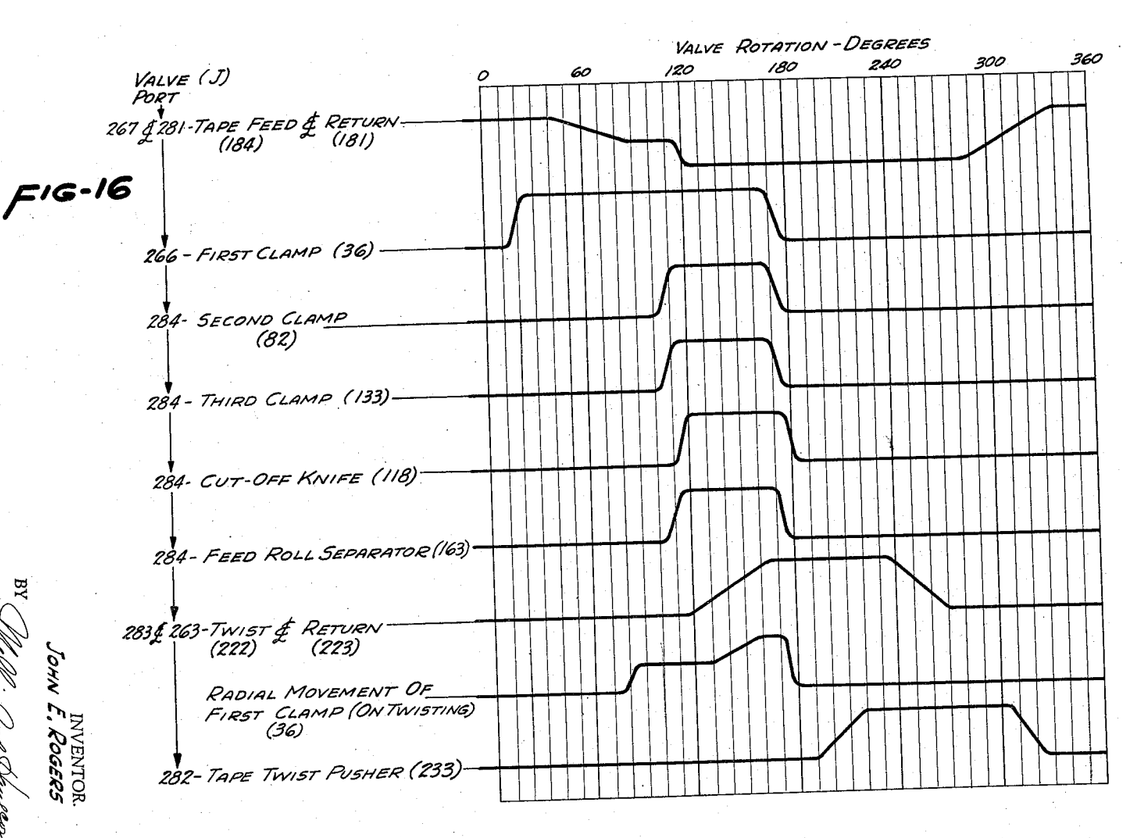
Fig. 16 is a graph illustrating the relative movements of each of the operating elements of my machine taking place during one complete cycle of operation of the machine.

Although these various factors have not been set forth in the above description, they are diagrammatically indicated in the nine curves appearing in Fig. 16, which will be presently described in greater detail in conjunction with a description of the operation of the machine.

Secured to the shaft 255 by a coupling 301 is the shaft 302 of a motor 303 in circuit with a power line through leads 304 and 305, including a normally open spring biased switch 306. Shunted around the switch 306 is a line 307, including a switch 308. Mounted on the shaft 255 is a cam 309 arranged to close the switch 308 and hold it closed for one revolution of the shaft and then open the switch. To start the machine, the switch 306 is momentarily closed so as to activate the motor. This will cause the cam 309 to close the switch 308 and to hold it closed for the remaining part of one complete revolution of the shaft. In turn, this will cause the machine to complete one cycle of revolution.

*Operation of the machine*

Preliminary to operating the machine, and with roller 157 retracted, the free end of a spool of paper tape 149 reinforced centrally with a wire 150 is threaded through the various tape tracks and channels of the machine. The roll 157 is then moved to its operating position so as to hold the tape in driving frictional engagement with the drive roll 143. At this stage, the machine is in the condition as shown in Fig. 4 with the tape 149 formed into a loop disposed within the confines of the helical channel or track 109. This position of the machine has been indicated as its zero or starting position in Fig. 16, and the corresponding position of the automatic valve has been indicated by the 0° line in Figs. 12 and 14.

The horizontal portion of each of the nine curves of Fig. 16 indicates a static condition and the duration thereof in degrees, whereas the inclined portions thereof indicate animation and the extent thereof in degrees. At the assumed zero position of the machine, a bunch of material M is fed into the loop of tape; then the starting switch 306 is momentarily closed to thereby initiate the first cycle of operation of the machine. The resulting rotation of the valve disc 258 places the line 57 under the operating air pressure (Fig. 15), and this causes the clamp pin 36 (first clamp) to close on the free end of the tape. As shown in the second curve of Fig. 16, this occurs at about the 12° position of the valve, and the first clamp is held closed until about the 165° position of the valve. Following this, and beginning at about the 40° position of the valve (first curve of Fig. 16), the valve places the line 200 under operating air pressure so as to activate the return cylinder 181 and simultaneously opens the line 205 to atmosphere. This in turn causes the friction rolls 143 and 157 to retract the tape to thereby wrap the tape loop snugly about the bundle M under a predetermined tension. As indicated by the first curve, this portion of the cycle of operation is completed at about the 90° position of the automatic control valve. Reference should now be had to the third, fourth, and sixth curves, from which it will be noted that at about 100° the control valve places the air line 65 under operating air pressure, which perforce places each of the lines 58, 126, 137, and 168 under operating air pressure. This closes the clamp pin 82 (second clamp) on the tape at a point outside of its loop, closes the pin 133 (third clamp) on the tape, and moves the pin 163 outwardly against the land 165 so as to move the friction roll 157 out of engagement with the tape. The knife moves upwardly to cut the tape between the second and third clamps, this action of the knife having been slightly delayed as a result of the restricted orifice 127. As illustrated in the five curves of Fig. 16, the movement of the knife starts at about 112°.

Here it should be noted from the eighth curve that as the tape has been retracted so as to wrap the tape loop about the material M, the first clamp holding the free end of the tape rotates slightly about the pin 25 (Fig. 11) against the biasing action of spring 72, this action occurring at about the 75° position of the control valve.

Following this, and as indicated by the seventh curve, the control valve operates to place the line 224 leading to the cylinder 222 under operating air pressure and simultaneously to place the line 226 under atmospheric pressure. This results in rotating the clamp head shaft 14 about one and a quarter turns and with it, the first and second clamps. The action here taking place can be noted more particularly from Fig. 9. As the loop ends are twisted about themselves the outer edges of the tape tear transversely at diametrically opposite points to the central reinforcing wire, the tear in one loop end coming into straddling or locking relationship with the other tape end. During the twisting of the tape, its clamped ends are placed in tension, and as the tension increases the pivoted first clamp rotates inwardly about its pin 25 against the biasing action of the spring 72 so as to prevent the tension on the tape from increasing to a point at which the tape and its reinforcing wire would break. This second rotational movement of the first clamp starts, as illustrated in the eighth curve of Fig. 16, at about the 130° position of the automatic control valve and about 10° after the clamp head starts to rotate. As shown in the seventh curve, the clamp head starts to rotate at about the 120° position of the valve and continues to rotate for about 45°.

At about the 165° position of the valve, the control valve operates to relieve the pressure on the air lines 57 and 65, and as a consequence the springs associated with the first, second, and third tape clamps are free to return these clamps to their open position; the friction roll is returned by its spring into frictional engagement with the tape; and the knife 118 is returned by its spring to its inoperative position. Also, at about this same time, and as indicated in the eighth curve of Fig. 16, the pivoted first clamp rotates back home on its pin 25.

Next, the control valve places the air line 241 under operating pressure to thereby actuate the pusher plate 234 so as to clear the twisted ends of the loop from the rotary clamp head prior to the time that the clamp head is returned to its initial or starting position. This, as shown in the ninth curve, occurs at about the 190° position of the valve.

Following this, and beginning at the 235° position of the control valve (seventh curve), the clamp head assembly B is rotated on its shaft 14 back to its zero or starting position, this being accomplished by the control valve which at this point serves to place the line 226 under operating pressure and to place the line 224 under atmospheric pressure.

Now, as illustrated in the first curve and beginning at about the 285° position of the control valve (first curve), the line 205 is activated, and the line 200 vented to atmosphere to thereby rotate the friction roll 143 counterclockwise (as viewed in Fig. 15) so as to feed a predetermined length of tape into the machine preparatory to another cycle of operation.

It should also here be noted that as illustrated in the first curve of Fig. 16, a portion of the tape originally fed into the machine is retracted when the loop is being driven tight around the material M. This occurs, as previously explained, between the 40° position of the valve and its 90° position. It is then necessary to retract the rack 178 to its home position, this movement being indicated on the first curve as occurring between the 110° and 120° position of the control. When this is done, the friction roll 157 must of course be disengaged from the tape, this being indicated in the sixth curve.

I claim:

1. A tying machine comprising: a base member; a clamp head journaled in said base member; a first normally open clamp pivoted to said head; a second normally open clamp fixed to said head and offset from said first clamp; means for biasing said first clamp to a predetermined position relative to said head; a bunch retainer fixed to said base member and formed with an opening encompassing said first and second clamps, said bunch retainer being provided with an internal, helical tape guide channel aligned at one end with said first clamp and at its other end with said second clamp; a third normally open clamp provided on said base member, said third clamp being in alignment with said second clamp and located externally to said bunch retainer; a tape cutter provided in said base member between said second and third clamps; means for feeding a length of tying tape through said third and second clamps through said helical guide in the form of a loop and into said first clamp; means for closing said first clamp into locking engagement with the leading free end of said tape; means for retracting said length of tape so as to wrap said tape snugly about a bundle disposed within said loop; means for closing said second and third clamps into locking engagement with said tape; means for actuating said cutter so as to sever said tape between said second and third clamps; and means for rotating said clamp head thereby to twist the free ends of said length of tape about each other.

2. A tying machine comprising: a base member; a clamp head journaled in said base member; a first normally open clamp pivoted to said head; a second normally open clamp fixed to said head and offset from said first clamp; a spring operating between said base member and said first clamp for biasing said clamp to a predetermined position relative to said base member; a bunch retainer fixed to said base member and formed with an opening encompassing said first and second clamps, said bunch retainer being provided with an internal, helical tape guide channel aligned at one end with said first clamp and at its other end with said second clamp; a third normally open clamp provided on said base member, said third clamp being in alignment with said second clamp and located externally to said bunch retainer; a tape cutter provided in said base member between said second and third clamps; means for feeding a length of tying tape through said third and second clamps through said helical guide in the form of a loop and into said first clamp; means for closing said first clamp into locking engagement with the leading free end of said tape; means for retracting said length of tape so as to wrap said tape snugly about a bundle disposed within said loop; means for closing said second and third clamps into locking engagement with said tape; means for actuating said cutter so as to sever said tape between said second and third clamps; and means for rotating said clamp head thereby to twist the free ends of said length of tape about each other.

3. A tying machine comprising: a base member; a clamp head journaled in said base member; a first normally open clamp pivoted to said head; a second normally open clamp fixed to said head and offset from said first clamp; a spring acting between said base member and said first clamp for biasing said first clamp to a predetermined position relative to said base member; a bunch retaining receptacle fixed to said base member and formed with an opening encompassing said first and second clamps, said receptacle being provided with an internal, helical tape guiding channel terminating at one end in alignment with said first clamp and at its other end in alignment with said second clamp; a third normally open clamp provided in said base member in alignment with said second clamp and located external to said receptacle; a tape cutter provided in said base member between said second and third clamps; a pair of friction drive rolls mounted on said base member in alignment with said second and third clamps; means for guiding tying tape between said rolls and through said third clamp; resilient means for driving one of said rolls so as to cause said rolls to advance said tape through said third and second clamps and around said helical tape guiding channel into said first clamp thereby to form said tape into a loop; means for closing said first clamp on the leading end of said tape; means for reversing the rotation of said rolls thereby to resiliently retract said tape and thereby snugly wrap it around any bundle disposed within said loop; means for closing said second and third clamps on said tape on either side of said cutter; and means for actuating said cutter.

4. A bunch tying machine comprising: a base member; a clamp head journaled in said base member; a first clamp pivoted to said head and including a first fixed jaw and a first movable jaw normally spaced from said first fixed jaw; a second clamp fixed to said head adjacent said first clamp and including a second fixed jaw and a second movable jaw normally spaced from said second fixed jaw; means for biasing said first clamp to a predetermined position; a cylindrical bunch retainer fixed to said base member and formed with an opening in alignment with said first and second clamps and provided with an internal helical channel having one end in alignment with said first clamp and its other end in alignment with said second clamp; a third clamp mounted on said base member external to said bunch retainer and in alignment with said second clamp; a cutter provided on said base member between said second and third clamps; means for feeding tying tape hrough said third and second clamps into and through said helical channel in the form of a loop and into said first clamp; means for closing said first clamp into the free end of said tape; means for retracting said tape so as to wrap said loop about any bundle disposed within said retainer; means for closing said second and third clamps on said tape; means for actuating said cutter so as to sever said tape between said second and third clamps; and means for rotating said clamp head so as to twist the ends of said tape about themselves.

5. A tying machine comprising: a base member; a clamp head journaled in said base member, a first clamp pivoted to said head and including a first fixed jaw and a first movable jaw normally spaced from said first fixed jaw; a second clamp fixed to said head adjacent said first clamp and including a second fixed jaw and a second movable jaw normally spaced from said second fixed jaw; means for biasing said first clamp to a predetermined position; a cylindrical bunch retainer fixed to said base member and formed with an opening in alignment with said first and second clamps and provided with an internal helical channel having one end in alignment with said first clamp and its other end in alignment with said second clamp; a third clamp mounted on said base member external to said bunch retainer and in alignment with said second clamp; a cutter provided on said base member between said second and third clamps; means for feeding tying tape through said third and second clamps into and through said helical channel in the form of a loop and into said first clamp; means for closing said first clamp into the free end of said tape; means for retracting said tape so as to wrap said loop about any bundle disposed within said retainer; means for closing said second and third clamps on said tape; means for actuating said cutter so as to sever said tape between said second and third clamps; and means for rotating said clamp head so as to twist the ends of said tape about themselves.

No references cited.